United States Patent [19]

Chuang

[11] Patent Number: 5,372,049

[45] Date of Patent: Dec. 13, 1994

[54] MOTOR-DRIVEN TRANSMISSION MECHANISM

[75] Inventor: Chen I. Chuang, Taipei, Taiwan, Prov. of China

[73] Assignee: Steve Yang, Taipei, Taiwan, Prov. of China

[21] Appl. No.: 72,123

[22] Filed: Jun. 7, 1993

[51] Int. Cl.$^5$ ............................................. F16H 19/04
[52] U.S. Cl. .................................... 74/30; 40/414
[58] Field of Search ...................... 74/30; 40/414, 430, 40/473

[56] References Cited

U.S. PATENT DOCUMENTS 2,381,112   8/1945   Clark ........................................ 74/30
4,294,554  10/1981   Mattsson ................................ 74/30 X Primary Examiner—Allan D. Herrmann
Attorney, Agent, or Firm—Browdy and Neimark

[57] ABSTRACT

A motor-driven transmission mechanism including a motor having a drive gear coupled to an output shaft thereof and extended out of a hole on a slide way above a table, a first transmission block driven by the drive gear to move in the slide way back and forth alternatively, a second transmission block carried on the first transmission block, a cover covered on the table over the first and second transmission blocks, a transmission shaft having one end coupled to a set of transmission gears being meshed with parallel racks on the second transmission block and an opposite end extended out of the cover and coupled to an ornament, whereby turning the motor causes the transmission shaft to rotate the ornament back and forth alternatively.

2 Claims, 5 Drawing Sheets 5,372,049

1

MOTOR-DRIVEN TRANSMISSION MECHANISM

BACKGROUND OF THE INVENTION

The present invention relates to a motor-driven transmission mechanism for moving ornaments.

A variety of motors are used for turning ornaments through a transmission mechanism. Cranks and links are commonly used for power transmission between the motor and the ornament. The motor must have a relatively bigger output so that the transmission mechanism can be effectively driven to move the ornament. However, a motor having a relatively bigger output is relatively expensive.

SUMMARY OF THE INVENTION

The present invention provides a transmission mechanism directly driven by a motor to turn an ornament back and forth alternatively, which is easy to assemble and inexpensive to manufacture. The transmission mechanism comprises a first transmission block driven by a drive gear on the motor to slide on a slide way in carrying a second transmission block to move a first transmission gear in one direction and second and third transmission gears in the reversed direction, and a transmission gear coupled to the first transmission gear and driven to turn an ornament back and forth alternatively.

DETAILED DESCRIPTION OF THE PREFERRED EMBODIMENT

Figure 1:
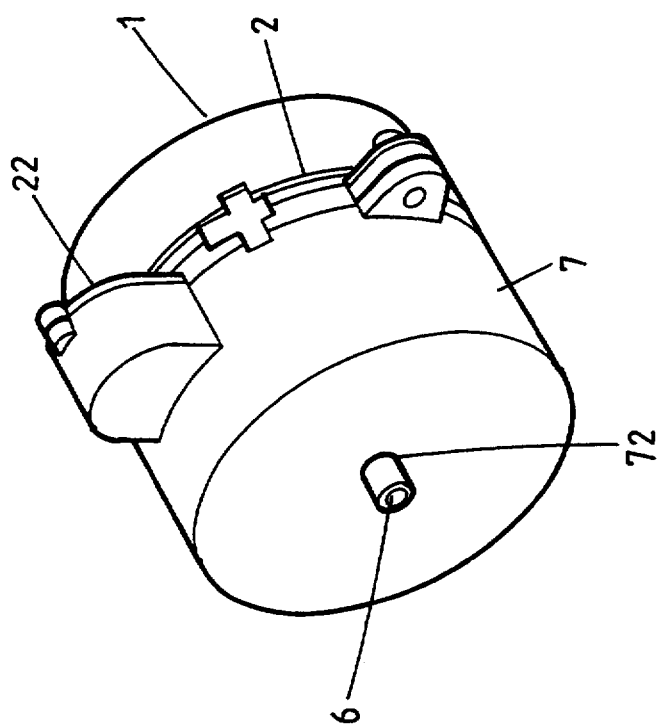
FIG. 1 is a perspective view of the motor-driven transmission mechanism of the present invention.
Figure 2:
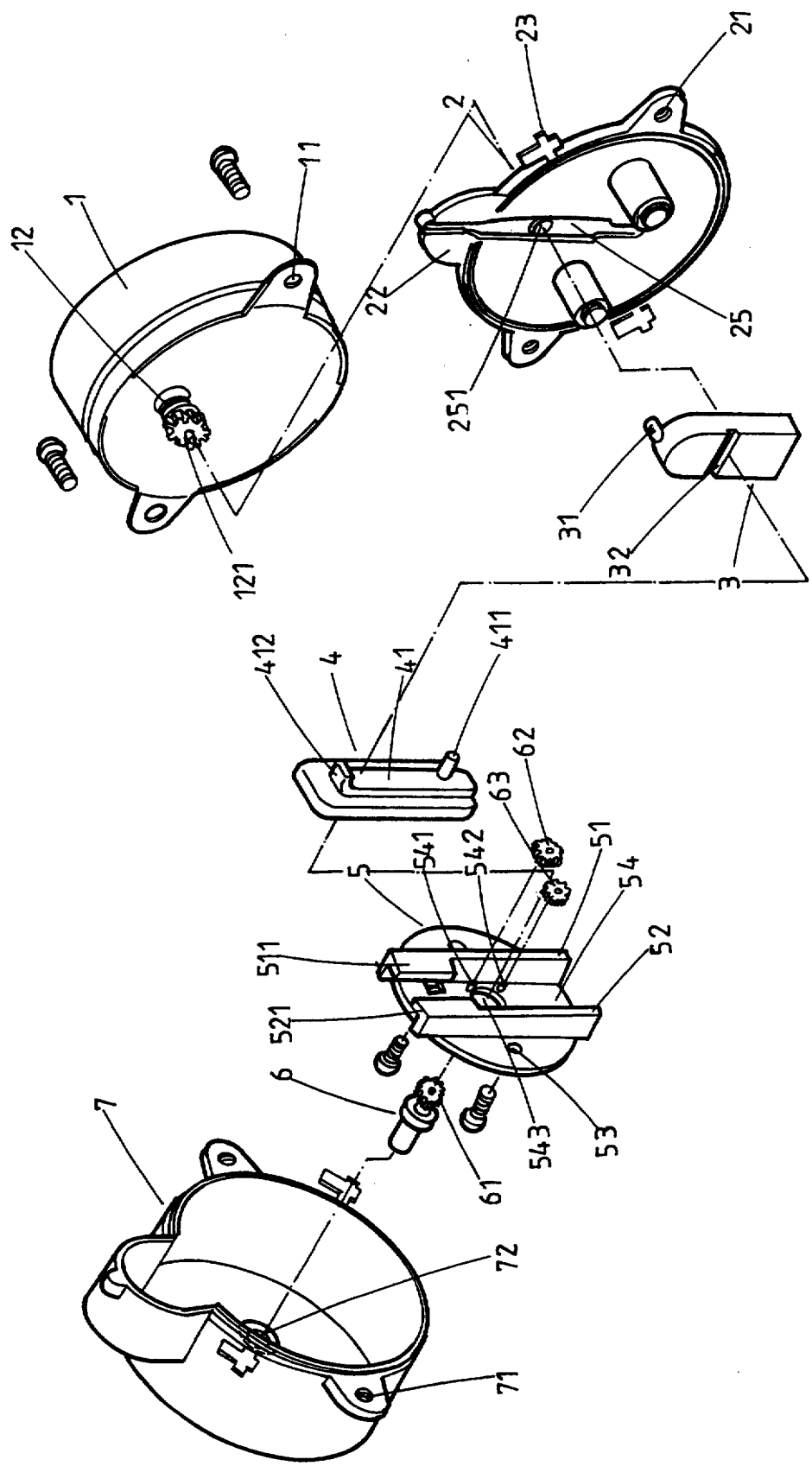
FIG. 2 is an exploded view of the motor-driven transmission mechanism of the present invention.
Figure 2B:
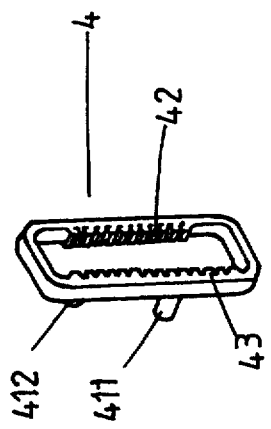
FIG. 2B is a different perspective view of the second transmission block shown in FIG. 2.
Figure 2A:
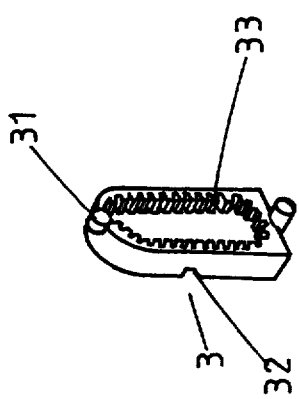
FIG. 2A is a different perspective view of the first transmission block shown in FIG. 2.

Referring to FIGS. 1 and 2, a motor-driven transmission mechanism in accordance with the preferred embodiment of the present invention is generally comprised of a motor 1, a table 2, a first transmission block 3, a second transmission block 4, a guide frame 5, a transmission shaft 6, a first transmission gear 61, a second transmission gear 62, a third transmission gear 63, and a cover 7.

The motor 1 comprises an eccentric output shaft 12 coupled with a drive gear 121, and two opposite mounting tabs 11. The table 2 comprises two opposite mounting tabs 21 and a projecting plate 22 and two cross-shaped projecting strips 23 respectively and horizontally projected from the periphery thereof, two upright female screw rods 24 spaced by a slide way 25 on one side thereof, and a round hole 251 on the slide way 25 in the middle.

The first transmission block 3 comprises an internal gear 33 and two opposite projecting rods 31 on one side thereof, and a transverse groove 32 on an opposite side thereof. The second transmission block 4 comprises two opposite racks, namely the shorter rack 42 and the longer rack 43 disposed in parallel with each other on one side thereof along the length, and an oblong rail 41 on an opposite side thereof which comprises an upright block 412 and an upright rod 411.

The guide frame 5 comprises two parallel rails 51;52 on one side thereof, each rail 51 or 52 having a horizontal stop wall 511 and 521 projecting toward each other, a track 54 defined between the parallel rails 51;52, two opposite mounting holes 53 outside the parallel rails 51;52, two opposite upright rods 541;542 and a center through hole 543 on the track 54. The second and third transmission gears 62;63 are respectively mounted on the upright rods 541;542 of the guide frame 5 and meshed with the longer rack 43 of the second transmission block 4. The transmission shaft 6 has one end inserted through the center through hole 543 on the guide frame 5 and coupled with the first transmission gear 61. The first transmission gear 61 is coupled to the transmission shaft 6 and meshed with the shorter rack 42 on the second transmission block 4. The cover 7 comprises two opposite mounting tabs 71, a center through hole 72, and two cross-shaped projecting strips 73.

The assembly process of the present invention is outlined hereinafter with reference to FIGS. 1 and 2 again, the eccentric output shaft 12 of the motor 1 is inserted through the through hole 251 on the slide way 25 of the table 2 for permitting the drive gear 121 to be disposed in the slide way 25, then the first transmission block 3 is placed on table 2 with the projecting rods 31 disposed in the slide way 25 for permitting the internal gear 33 to mesh with the drive gear 121, then the upright block 412 of the second transmission block 4 is engaged into the transverse groove 32 on the first transmission block 3 and then the guide frame 5 is covered over the second transmission block 4 for permitting the second transmission block 4 to be received in the track 54 of the guide frame 5 and for permitting the short rack 42 and the long rack 43 to be respectively meshed with the first transmission gear 61 and the second and third transmission gears 62;63, then the guide frame 5 is fixed to the table 2 by threading respective screws through the mounting holes 53 on the guide frame 5 into the upright female screw rods 24 on the guide frame 2, and then the cover 7 is covered on the table 2 to hold the guide frame 5 and the first and second transmission blocks 3;4 on the inside for permitting the transmission shaft 6 to extend out of the center through hole 72 on the cover 7, and then the mounting tabs 11;21;71 of the motor 1 and the table 2 and the cover 7 are respectively fastened together by fastening elements. After assembly, the opposite end of the transmission shaft 6 extends out of the cover 7 and coupled to an ornament.

Figure 4:
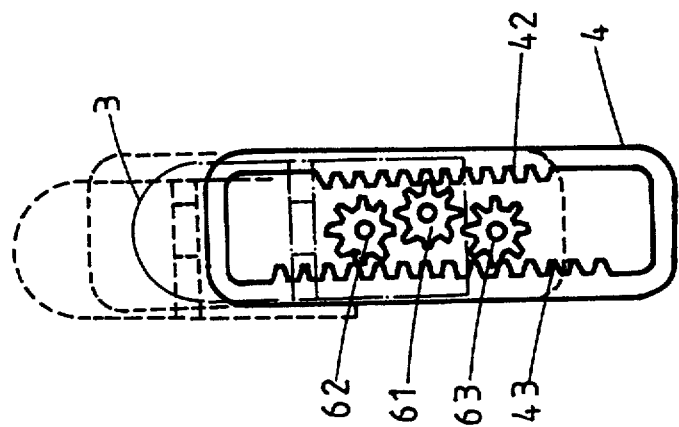
FIG. 4 is a plain view showing the internal gear of the first transmission block meshed with the drive gear.
Figure 3:
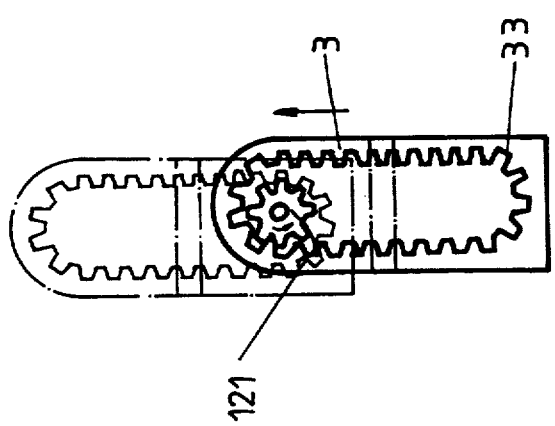
FIG. 3 is a plain view showing the the longer and shorter racks of the second transmission block respectively meshed with the second and third transmission gears and the first transmission gear.
Figure 5:
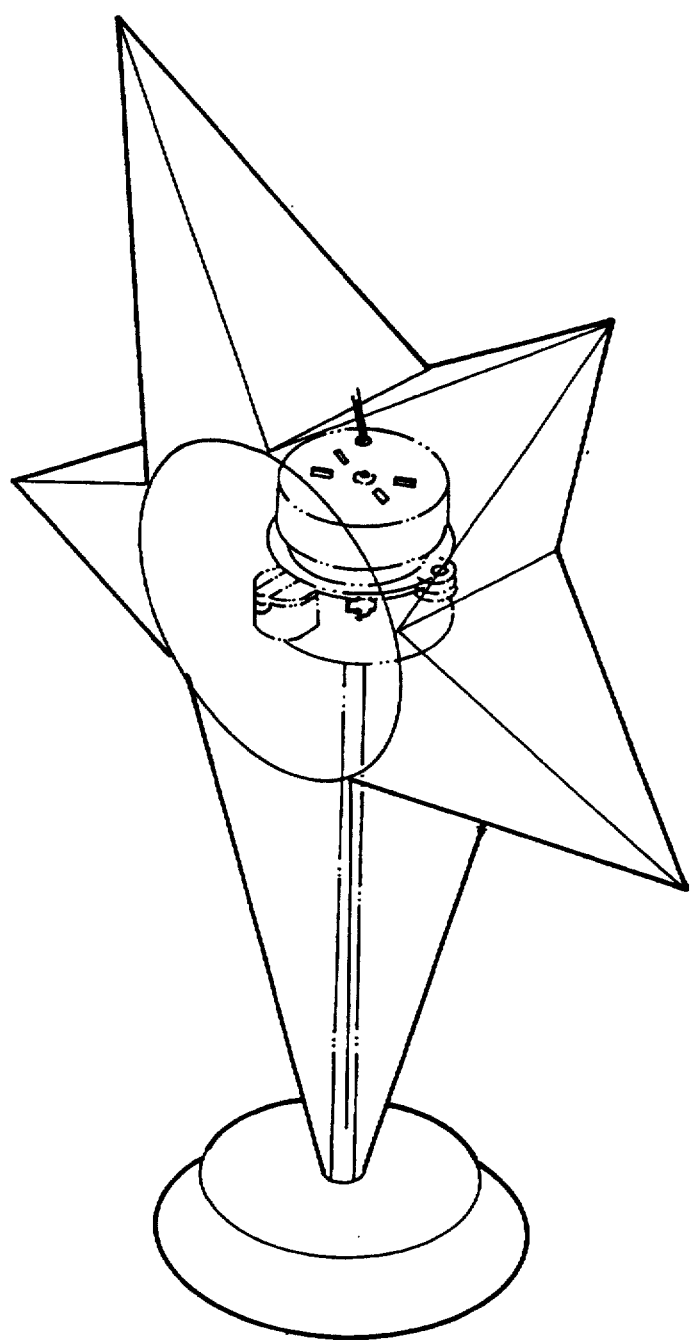
FIG. 5 is an applied view showing the motor-driven transmission mechanism installed in a toy to move an ornament.

Referring to FIGS. 3 and 4, as the motor 1 is turned on, the drive gear 121 is rotated to move the first transmission block 3 in the slide way 25 back and forth alternatively. As shown in FIGS. 2 and 3 drive gear 121 remains in continuous contact with internal gear 33 because projecting rods 31 permit block 3 to shift both in a longitudinal and transverse direction while engaged in slideway 25. As the first transmission block 3 is moved to carry the second transmission block 4 forward, the second and third transmission gears 62;63 are rotated clockwise to move along the longer rack 43 and the first transmission gear 61 is rotated counterclockwise through 360° angle to move along the shorter rack 42; as the first transmission block 3 is moved to carry the second transmission block 4 backward, the second and third transmission gears 62;63 are rotated counterclockwise to move along the longer rack 43 and the first transmission gear 61 is rotated clockwise through 360° angle to move along the shorter rack 42. Therefore, the ornament can be alternatively rotated by the transmission shaft 6 in either direction through 360° angle.

While only one embodiment of the present invention has been shown and described, it will be understood that various modifications and changes could be made without departing from the spirit and scope of the invention.

What is claimed is:

1. A motor-driven transmission mechanism, comprising:

a motor having an output shaft;

a table fastened to said motor at one side, said table having a slide way on one side thereof, and a round hole on said slide way in the middle through which said output shaft inserts;

a drive gear coupled to said output shaft and disposed in said slide way;

a first transmission block driven by said drive gear to move in said slide way back and forth alternatively, said first transmission block comprising an internal gear meshed with said drive gear, two opposite projecting rods inserted in said slide way, said rods alternatively moved to stop at either end of said slide way for a respective limit control and to maintain said drive gear in continuous engagement with said internal gear, and a transverse groove on an opposite side thereof;

a second transmission block carried on said first transmission block, said second transmission block comprising a longer rack and a shorter rack disposed in parallel with each other on one side thereof, and an oblong rail on an opposite side thereof, said oblong rail comprising an upright block engaged into said transverse groove on said first transmission block and an upright rod stopped at one end of said first transmission block;

a guide frame fastened to said table to guide said second transmission block above said first transmission block, said guide frame comprising a track defined between two parallel rails on one side thereof, which receives said second transmission block, two upright rods, and a center hole;

a set of transmission gears including a first transmission gear meshed with said shorter rack on said second transmission block, a second transmission gear and a third transmission gear respectively meshed with said longer rack on said second transmission block;

a cover fastened to said table to hold said guide frame and said first and second transmission blocks on the inside, said cover having a center through hole aligned with the center through hole on said guide frame; and a transmission shaft having one end inserted into the center through hole on said guide frame and coupled with said first transmission gear, and an opposite end extended out of the center through hole on said cover and coupled to an ornament;

whereby turning said motor to move said first transmission block in said slide way back and forth alternatively causes said set of transmission gears to drive said transmission shaft in turning said ornament back and forth alternatively through a predetermined angle of rotation.

2. The motor-driven transmission mechanism according to claim 1 wherein the number of teeth of said shorter rack on said second transmission block is determined according to the desired angle of rotation.

* * * * *